E. A. GOODES.
Thrashing Machine.
No. 98,951.   Patented Jan. 18, 1870.
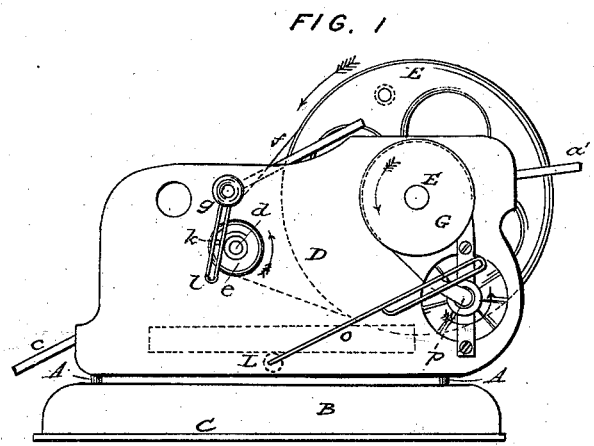
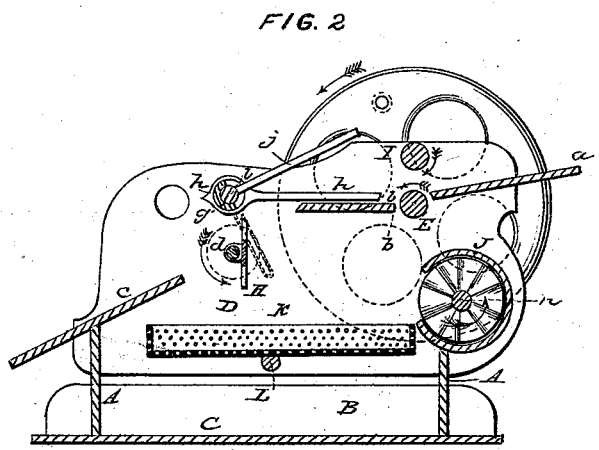
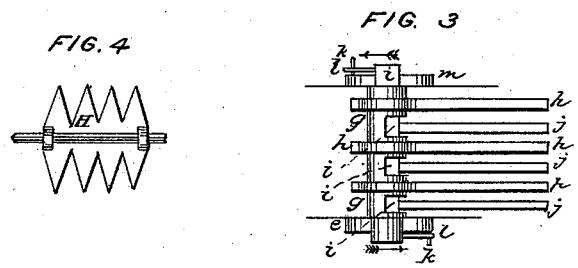
WITNESSES:
Adolphe Rod
Phil. F. Larner
INVENTOR:
E. A. Goodes
by John A. Bredensheim
Atty.

# United States Patent Office.

E. A. GOODES, OF PHILADELPHIA, PENNSYLVANIA.

Letters Patent No. 98,951, dated January 18, 1870.

IMPROVEMENT IN THRESHING-MACHINES.

The Schedule referred to in these Letters Patent and making part of the same.

*To all whom it may concern:*

Be it known that I, E. A. GOODES, of the city and county of Philadelphia, and State of Pennsylvania, have invented a useful and improved Threshing-Machine; and I do hereby declare the following to be a full, clear, and exact description thereof, sufficient to enable others skilled in the art to which my invention appertains, to make and use the same, reference being had to the accompanying drawings, in which—

Figure 1 is a side elevation of my threshing-machine;

Figure 2 is a longitudinal vertical central section of the same;

Figure 3 is a top view of the flails; and

Figure 4 is a top view of the rotary forks.

The main features of invention in this threshing-machine are the relative arrangement of two sets of flails, and the peculiar mode of operating them, one set being attached to a solid shaft, placed within a hollow shaft, provided with suitable slots, and having a set of flails, which shafts are both partially rotated by means of a peculiar arrangement of mechanism, as hereinafter described.

A rotary shaft, provided with pointed wings, and arranged below the flails, is used to throw away the straw, and this forms a second feature of improvement.

The fan consists of two spiral wings or propeller-wheels, one being a right-hand screw, and the other a left, attached to the opposite ends of a shaft passing through the centre of a cylinder, open at both ends, so as to draw in the air at the ends of the cylinder, and force it out at an opening in the front. This constitutes another feature of invention.

The sieve is operated by means of a slotted arm, having a rapid oscillating motion imparted to it by the crank on the outer end of the fan-shaft. This forms another new feature.

In order to enable others to fully understand my invention, I will now proceed to describe, in detail, the construction and operation of my improved threshing-machine.

Similar letters of reference indicate like parts in the several figures of the plate.

Referring to the drawings—

A A represent upright end-pieces, attached to a base, C, and having secured to them narrow side-boards, B, at the bottom and the sides, D D, of the main frame, above.

These sides D D are held together and strengthened by tables $a$ $b$ $c$, of which the first, $a$, serves as a surface, from which the material is passed between feed-rollers on to the second table $b$, where it is subjected to the action of the flails, from which the straw falls on to the third surface $c$, which, being inclined, conducts the straw away.

E represents the main shaft, journaled in bearings in the sides D D of the frame, and carrying, at one end, the driving and fly-wheel F, and at the other, a pulley, G.

$d$ represents a shaft, mounted like the main shaft, and having a pulley, $e$, at one end, over which passes a band, $f$, from the driving-wheel.

Almost immediately above the shaft $d$ is journaled a hollow shaft, $g$, to which are attached several arms, $h$ $h$, which act as flails.

Fitted loosely within the hollow shaft $g$ is a solid shaft, $i$, to which are attached flails $j$ $j$, alternating with those fixed to the tubular shaft, which latter is provided with slots, as shown, in which the flails $j$ $j$ work.

The solid and tubular shafts $g$ $i$ are partially rotated in opposite directions, the former being operated by means of a pin, $k$, set eccentrically in the pulley $e$ of shaft $d$, and working in the slot of an arm, $l$, rigidly attached to the shaft, and the latter, $i$, being operated in the same manner, from a disk, $m$, at the opposite end of the shaft $d$, from the pulley $e$.

The shaft $d$ is provided with a set of double-pointed wings or forks, H, which take the refuse straw from the table $b$, and throw it on to the inclined table $c$.

The main shaft E, between the sides of the frame, is so made as to form the lower one of a pair of feed-rollers, the upper one, I, being journaled in bearings in the frame.

J represents the fan-cylinder, which is secured between the sides of the frame, at the top of the end-standard A. This cylinder is operated at the ends and in front.

$n$ is a shaft passing through the centre of the cylinder J, and having fixed, at each end, propeller-wheels, of which one is in form of a right-hand screw, and the other, a left; the fan-shaft being driven by means of a belt from the pulley on the main shaft. Air is drawn in at the ends of cylinder J, and forced out at the opening in the front.

The sieve K is mounted, centrally, on a rock-shaft, L, journaled in bearings in the sides of the frame, and having attached, to one end, an arm or rod, $o$, formed with a slot in its upper end, in which works a pin, $p$, fixed in a crank in one end of the fan-shaft.

The operation is as follows:

The machine having been set in motion, by means of a handle applied to the drive-wheel, or by any other suitable means or power, the grain is spread upon the table $a$, and pushed toward the feed-rollers, between which it passes, and is evenly spread upon the table $b$. Here it is subjected to the action of two sets of flails, which rise and fall rapidly, and alternately come in contact with the table $b$. The rotary fork seizes the straw and throws it on to the inclined surface *c*, which conducts it from the machine. The chaff is carried off by the continuous blast, caused by the fan, and the threshed grain falls into the rocking-sieve, where it is thoroughly cleansed and separated.

The flails, as arranged and operated in this machine, will be found to effect the complete threshing of the grain, without injuring the same, and very expeditiously. The sides and ends of the sieve, as well as its bottom, being perforated, as shown, and the whole being rocked rapidly, instead of shaken, as ordinarily, the separation of the grain will be accomplished completely, and in a short time. As a whole, the machine is unusually simple, and when compared with others of much more complicated construction, will be found to produce equally satisfactory results.

Having thus described my invention,

What I claim as new, and desire to secure by Letters Patent, is—

1. The sets of flails *j* and *h*, attached, respectively, to their shafts, having a common axis, when the parts are constructed to operate substantially as and for the purpose set forth.

2. The rotating fork H, constructed with toothed wings, and arranged, in relation to the tables *b c*, substantially as and for the purpose described.

3. The fan, composed of right and left screw-propeller wheels, fixed on a shaft arranged within a cylinder, J, open at the ends and in front, substantially as described.

4. The sieve, having the sides and ends perforated, as well as the bottom, and mounted centrally, on a rock-shaft, to which motion is imparted, in the manner and for the purpose substantially as described.

5. The combination and arrangement of the flails, tables *a b c*, rotary fork, sieve, and feed-rollers, and their operating-mechanism, all constructed and operating substantially as described.

The above signed by me, this 9th day of October, 1869.

E. A. GOODES.

Witnesses:
CHARLES H. WEISS,
ENOCH TAYLOR.